United States Patent
Han et al.

(10) Patent No.: US 8,331,797 B2
(45) Date of Patent: Dec. 11, 2012

(54) POLARIZATION-CONTROLLED ENCODING METHOD, ENCODER, AND QUANTUM KEY DISTRIBUTION SYSTEM

(75) Inventors: Zhengfu Han, Anhui (CN); Bing Zhu, Anhui (CN); Xiaofan Mo, Anhui (CN); Guangcan Guo, Anhui (CN)

(73) Assignee: University of Science and Technology of China, Anhui (CN)

( * ) Notice: Subject to any disclaimer, the term of this patent is extended or adjusted under 35 U.S.C. 154(b) by 1393 days.

(21) Appl. No.: 10/588,042

(22) PCT Filed: Aug. 19, 2004

(86) PCT No.: PCT/CN2004/000969
§ 371 (c)(1), (2), (4) Date: May 15, 2007

(87) PCT Pub. No.: WO2005/076517
PCT Pub. Date: Aug. 18, 2005

(65) Prior Publication Data
US 2008/0037998 A1    Feb. 14, 2008

(30) Foreign Application Priority Data
Feb. 2, 2004   (CN) .......................... 2004 1 0013996

(51) Int. Cl.
*H04B 10/04* (2006.01)
*H04B 10/00* (2006.01)
(52) U.S. Cl. .................... 398/183; 398/152; 398/205
(58) Field of Classification Search .............. 380/256; 398/152, 183, 205
See application file for complete search history.

(56) References Cited

U.S. PATENT DOCUMENTS
| | | | |
|---|---|---|---|
| 6,438,234 B1 * | 8/2002 | Gisin et al. | 380/256 |
| 7,555,127 B2 * | 6/2009 | Nambu et al. | 380/256 |
| 2004/0086280 A1 * | 5/2004 | Duraffourg et al. | 398/186 |

FOREIGN PATENT DOCUMENTS
WO    WO 0249267 A1 *   6/2002

* cited by examiner

*Primary Examiner* — Kenneth N Vanderpuye
*Assistant Examiner* — Daniel Dobson
(74) *Attorney, Agent, or Firm* — McDermott Will & Emery LLP

(57) ABSTRACT

The invention relates to a polarization-controlled encoding method, encoder and quantum key distribution system, which is characterized in that polarization maintaining light path or 90 degree rotation Faraday mirror are used inside the encoder to keep the polarization of the output pulses same, and that in the quantum key distribution system employing the polarization-controlled encoder the pulse emitted from transmitter is unidirectional-transmitted to receiver and then quantum key distribution is implemented using interference in the pulses according to the quantum key distribution protocol. The quantum key distribution system using the polarization-controlled encoder of the invention has the ability of avoiding the wiretapping to transmitter, receiver and quantum channel. Detection units each of which separates reversed photon from other photons are added at the out port of the transmitter and the in port of receiver, respectively, so that Trojan horse is prevented from entering and photons with phase modulated information are prevented from leaving the safe area in receiver. Unconditionally safe key distribution can be accomplished by using the quantum key distribution system of the invention.

6 Claims, 5 Drawing Sheets

POLARIZATION-CONTROLLED ENCODING METHOD, ENCODER, AND QUANTUM KEY DISTRIBUTION SYSTEM

FIELD OF THE INVENTION

This invention relates to the field of secure optical communication, and more particularly to an encoding method and device in quantum key distribution system.

DESCRIPTION OF THE RELATED ART

Early encoding scheme of quantum key distribution is based upon photon polarization. This scheme is fit for free-space communication instead of fiber communication. That's because the symmetry of normal fiber is not good and the interference in transmission path disturbs the polarization state, the photon polarization will be random changed during transmission in it. U.S. Pat. No. 5,307,410 disclosed a phase encoding scheme of quantum key distribution which bases on a pair of unbalanced Mach-Zehnder interferometers. Because the optical pulses pass through the different arms of the different interferometers in transmitter and receiver, the disturbance they suffered is not exactly identical to each other and can't be counteracted. The stability and anti-jamming ability of the system is bad. Also because two photon pulses pass through the different arms of transmitter's interferometer, the polarization relation between two photon pulses is uncertain when they enter the quantum channel. This system is sensitive to the disturbance in quantum channel, especially for long distance quantum key distribution. A lot of variations of this scheme have no essential improvement.

In order to improve the stability of above scheme, a publication in Applied Physics Letters (vol 77 (No. 7), 793 (1997)) discloses a solution that uses Faraday mirrors in receiver to reflect optical pulses back to the transmitter so that the interfering pulses follow exactly the same optical path. This will get self-balancing effect. This scheme assumes that the disturbance is same when optical pulses pass through the same position twice and then they are counteracted to achieve the object of anti-jamming and stability. In fact, it works only for short distance and low disturbance frequency. When transmission distance increases, the time slot in which the optical pulses pass through the same position twice also increases, and the anti-jamming ability decreases. Furthermore, because the optical pulses pass through the same quantum channel twice, the loss of total optical path should be double. This can be solved by method with strong coming laser pulse and attenuating it to single photon level after reflecting. But, it can be used only for attenuated laser source. The ideal optical source for quantum key distribution is single photon source. When the single photon source becomes available, the maximum transmission distance should be half of the unidirectional scheme. On the other hand, an eavesdropper can attenuate the strong coming laser pulse before it reach the communication receiver, and then combine it with a spy laser pulse whose wavelength is close to the original one to make the total power as same as before, that will make power monitor of no effect. When the signals come back, the spy signal can be separated to get the information of communication receiver, and the original signal will be still transmitted to transmitter through an "ultra-low loss channel" so that the eavesdropper won't be detected. This is deadly for information security.

SUMMARY OF THE INVENTION

The present invention provides a polarization-controlled quantum key distribution encoding method, encoder and system. It can provide unconditional secure key distribution between two users.

The polarization-controlled encoding method comprises the steps of: splitting an injected optical pulse into two optical pulses traveling along two different paths; and relatively delaying the two optical pulses; recombining the delayed pluses in one output path; wherein the method further comprises a step of phase modulating at least one pulse after the splitting step or recombining step according to a quantum key distribution protocol, and a step of controlling the polarization states of two pulses during the course from the splitting to the recombining to make the polarization states same after recombining.

Preferably, the step of controlling comprises: keeping the polarization states of two optical pulses fixedness during the course from the splitting to the recombining.

Preferably, the step of controlling comprises: making the two optical pulses reflected odd times by 90 degree Faraday mirrors separately, and passing them through the same path even times respectively.

Preferably, the step of controlling comprises: making one optical pulse outputted directly and another optical pulse reflected even times by 90 degree Faraday mirrors, and passing the reflected pulse through the same path even times.

First polarization-controlled encoder constructed by using the method comprises: a first polarization-maintained beam splitter for splitting an optical pulse into two optical pulses traveling along two different paths; a delay line for relatively delaying the two optical pulses; a second polarization-controlled beam splitter for recombining the delayed pluses in one output path; and at least one phase modulator arranged on at least one path of the two different paths and the output path, wherein the two different paths are polarization-maintained paths.

Second polarization-controlled encoder constructed by using the method comprises: a polarization-maintained beam splitter for splitting an optical pulse into two optical pulses traveling along two different paths; a polarization-maintained delay line arranged on one of the two different paths for relatively delaying the two optical pluses; at least one mirror for reflecting the delayed pluses to the polarization-maintained beam splitter to recombine the delayed pulses in one output path; and at least one phase modulator arranged on at least one of the two different paths and the output path, wherein the two different paths are polarization-maintained paths.

Third polarization-controlled encoder constructed by using the method comprises: a beam splitter for splitting an optical pulse into two optical pulses traveling along two different paths; a delay line arranged on one of the two different paths for relatively delaying the two optical pluses; two 90 degree Faraday mirrors for respectively reflecting the delayed pluses back the beam splitter to recombine the delayed pulses in one output path; and at least one phase modulator arranged on at least one of the different paths and the output path.

Fourth polarization-controlled encoder constructed by using the method comprises: a variable polarization-maintained beam splitter for splitting an optical pulse into two optical pulses traveling along two different paths and outputting one optical pulse directly; a first mirror for reflecting another optical pulse back the variable polarization-maintained beam splitter and passing it through the variable polarization-maintained beam splitter; a second mirror for reflecting the pulse passed through the variable polarization-maintained beam splitter back, wherein the variable polarization-maintained beam splitter recombines the reflected pulse with the outputted pulse in one output path; a polarization-maintained delay line arranged on the paths between the first and second mirrors; and at least one phase modulator arranged on at least one of the two different paths and the output path, wherein the paths between the first and second mirrors are polarization-maintained paths.

Fifth polarization-controlled encoder constructed by using the method comprises: a beam splitter for splitting an optical pulse into two optical pulses traveling along two different paths and outputting one optical pulse directly; a first 90 degree Faraday mirror for reflecting another optical pulse back the beam splitter and passing it through the beam splitter; a second 90 degree Faraday mirror for reflecting the pulse passed through the beam splitter back, wherein the beam splitter recombines the reflected pulse with the outputted pulse in one output path; a delay line arranged on the paths between the first and second mirrors; and at least one phase modulator arranged on at least one of the paths between the first and second mirrors and the output path.

A quantum key distribution system comprises: a transmitter side polarization-controlled encoder for splitting an optical pulse emitted from a pulse light source into two optical pulses traveling along two different paths, relatively delaying the two optical pulses and recombining the optical pulses in one output path, wherein at least one of the optical pulses is phase-modulated according to a quantum key distribution protocol; at least one quantum channel for unidirectional-transmitting the optical pulses output from the transmitter side polarization-controlled encoder; a receiver side polarization-controlled encoder for receiving the optical pulses from the quantum channel, splitting each of the optical pulses into two optical pulses which form a group and travel along two different paths, relatively delaying the two optical pulses on the basis of the quantum key distribution protocol, and recombining the two optical pulses in one output path, wherein at least one of the received optical pulses, the split optical pulses, the delayed pulses is phase-modulated before recombined in one output path according to the quantum key distribution protocol; and a single photon detector for measuring at least one superposition interference of two pulses come from different groups and distributing a quantum key according to the quantum key distribution protocol.

Preferably, the system further comprises a return photon separating and detecting unit that is added in the output of a transmitter or in the input of a receiver, the return photon separating and detecting unit comprises an optical circulator and a single photon detector, wherein an input port of the unit connects with an output port of the encoder, and an output port of the unit connects with the quantum channel, and a reverse output port of the unit connects with an input port of the single photon detector.

Preferably, the return photon separating and detecting unit further comprises a band pass filter arranged before the input of the circulator.

The quantum channel may be optical waveguide, fiber, free space, separating optical component or propagation channel made up of above.

Comparing with existing encoder bases on Mach-Zehnder interferometer, the encoder of present patent controls polarization state of optical pulse inside itself. This makes it insensitive to disturbance on itself so that the environment requirements of quantum key distribution system reduced largely. Because two pulses injected into the quantum channel are controlled at same polarization state, the disturbance they suffered when transmitting is compensated before they enter the receiver. That means signal transmitting is independent of channel disturbance. The stability of system is improved greatly. In the encoder with 90 degree Faraday mirrors according to the invention, the pulse passes through the phase modulator twice with orthogonal polarization. If the duration of phase modulating signal is larger than the time slot during which the pulse pass through modulator twice, the modulation will be independent of polarization. So the polarization-dependent modulator can be used to achieve polarization-independent modulation. The requirement of modulation rate will also be reduced. In the encoder with polarization-maintained beam splitter according to the invention, since polarization of optical pulses is maintained, polarization-dependent modulator can be used.

In quantum key distribution system according to the invention, return photon separating and detecting unit can be added to separate and detect any reverse transmitted photons. This will not only prevent spy photons from entering the encoder to eavesdrop information but also detect whether there is an eavesdropper. Since single photon detector and circulator have a certain range of response wavelength, optical band pass filter can be added in the quantum key distribution system so that optical pulses with wavelength in working spectrum can pass through the filter, pulses with wavelength out of working spectrum can not pass through the filter. This can compensate the disadvantage that single photon detector and circulator don't have enough response band.

DETAILED DESCRIPTION OF THE PREFERRED EMBODIMENT

First Embodiment

Figure 1:
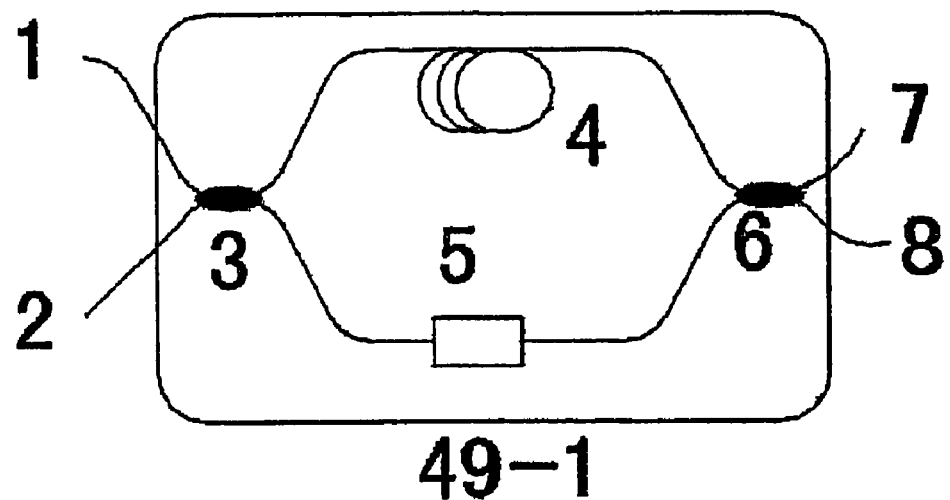
FIG. 1 is a block diagram of Mach-Zehnder interferometer based polarization-controlled with polarization-maintained paths.

The first configuration of polarization-controlled encoder in quantum key distribution system is shown in FIG. 1. It includes two 2×2-3 dB polarization-maintained beam splitters 3 and 6, one polarization-maintained phase modulator 5 and one polarization-maintained delay line 4. These form a Mach-Zehnder interferometer. Any one of the two ports 1 and 2 which are in the same side of 3 dB beam splitter 3 can be the input port of polarization-controlled encoder. Any one of the two ports 7 and 8 which are in the same side of 3 dB beam splitter 6 can be the output port. The modulator 5 and delay line 4 (no sequencing) can be inserted into one arm of the Mach-Zehnder interferometer or two arms separately. When the system works, an optical pulse is injected into port 1 or 2 of beam splitter 3 and divided into two pulses. One pulse passes through the modulator 5. Another one pass through the delay line 4.

Then they are recombined by beam splitter 6 and output from port 7 or 8. Because all the paths are polarization-maintained, the output pulses have same polarization state. When the modulator 5 and delay line 4 are in the same arm of Mach-Zehnder interferometer, the result is the same.

Second Embodiment

Figure 2:
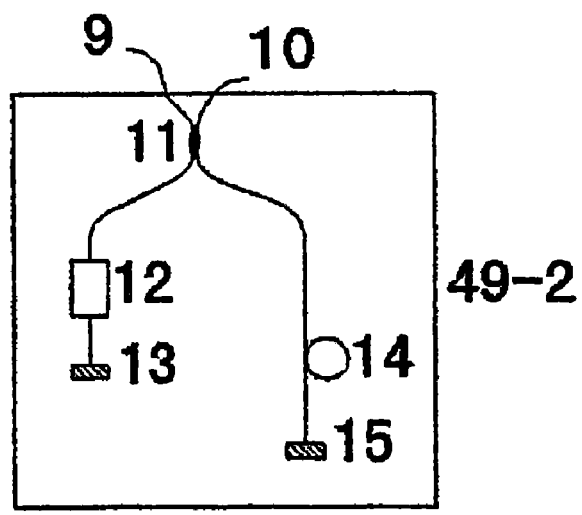
FIG. 2 is a block diagram of polarization-controlled encoder with mirrors and polarization-maintained paths.

The second configuration of polarization-controlled encoder in quantum key distribution system is shown in FIG. 2. It includes one 2×2-3 dB polarization-maintained beam splitter 11, two mirrors 13 and 15, one polarization-maintained phase modulator 12 and one polarization-maintained delay line 14. These two ports 9 and 10 which are in the same side of 3 dB beam splitter 11 are input and output ports of polarization-controlled encoder respectively. One of the two ports which are in the other side of 3 dB beam splitter 11 connects with polarization-maintained phase modulator 12 and mirror 13 in turn. The other port connects with polarization-maintained delay line 14 and mirror 15 in turn. A variation of above configuration is to connect one port of beam splitter with modulator 12, delay line 14 and mirror in turn, and connect the other port of beam splitter with only a mirror. When the system works, an optical pulse is injected into port 9 of polarization-maintained beam splitter 11 and divided into two pulses. One pulse pass through the delay line 14 and reflected back by mirror 15. The other pulse pass through the modulator 12 and reflected back by mirror 13. Then they are recombined by beam splitter 11 and output from port 10. Because all the paths are polarization-maintained, the output pulses have same polarization state. The variation of above configuration has same result. Either port 9 is input and port 10 is output or reverse have same result.

Third Embodiment

Figure 3:
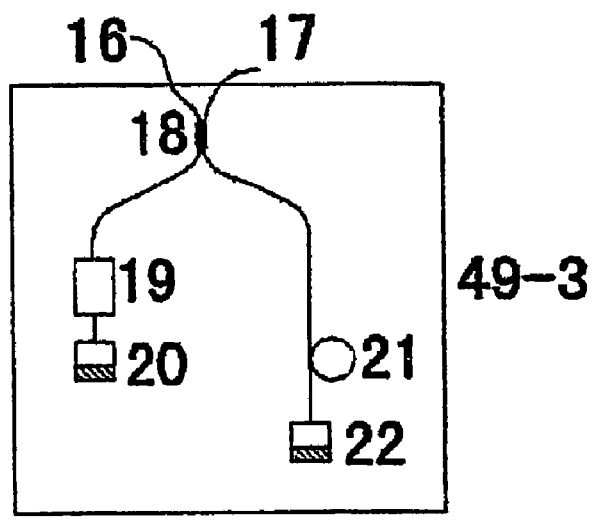
FIG. 3 is a block diagram of polarization-controlled encoder with 90 degree Faraday mirrors.

The third configuration of polarization-controlled encoder in quantum key distribution system is shown in FIG. 3. It includes one 2×2-3 dB beam splitter 18, two 90 degree Faraday mirrors 20 and 22, one phase modulator 19 and one delay line 21. The two ports 16 and 17 which are in the same side of 3 dB beam splitter 18 are input and output ports of polarization-controlled encoder respectively. One of the two ports which are in the other side of 3 dB beam splitter 18 connects with phase modulator 19 and 90 degree Faraday mirror 20 in turn. The other port connects with delay line 21 and 90 degree Faraday mirror 22 in turn. When the system works, an optical pulse is injected into port 16 of beam splitter 18 and divided into two pulses. One pulse pass through the delay line 21 and reflected back by 90 degree Faraday mirror 22. The other pulse pass through the modulator 19 and reflected back by 90 degree Faraday mirror 20. Then they are recombined by beam splitter 18 and output from port 17. Because the two pulses are reflected by 90 degree Faraday mirrors and pass through their own path even times, the output pulses have same polarization state. Either port 17 is input and port 16 is output or reverse has same result.

Fourth Embodiment

Figure 4:
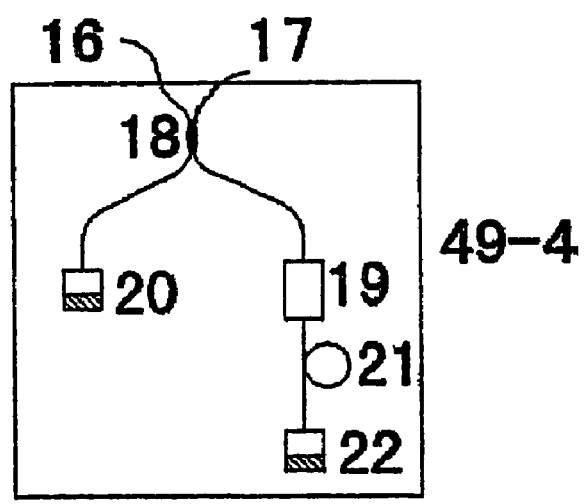
FIG. 4 is a block diagram of another type of polarization-controlled encoder with 90 degree Faraday mirrors.

The configuration of a variation of the third embodiment is shown in FIG. 4. The difference from the third embodiment is one port of beam splitter connects with modulator 19, delay line 21 (position of them can be exchanged) and 90 degree Faraday mirror 22 in turn, and the other port of beam splitter connects with a 90 degree Faraday mirror 20. When the system works, an optical pulse is injected into port 16 of beam splitter 18 and divided into two pulses. One pulse pass through the phase modulator 19 and delay line 21 (no sequencing) and reflected back by 90 degree Faraday mirror 22. The other pulse reflected back by 90 degree Faraday mirror 20. Then they are recombined by beam splitter 18 and output from port 17. Because the two pulses are reflected by 90 degree Faraday mirrors and pass through their own path even times, the output pulses have same polarization state. Either port 17 is input and port 16 is output or reverse has same result.

Fifth Embodiment

Figure 6:
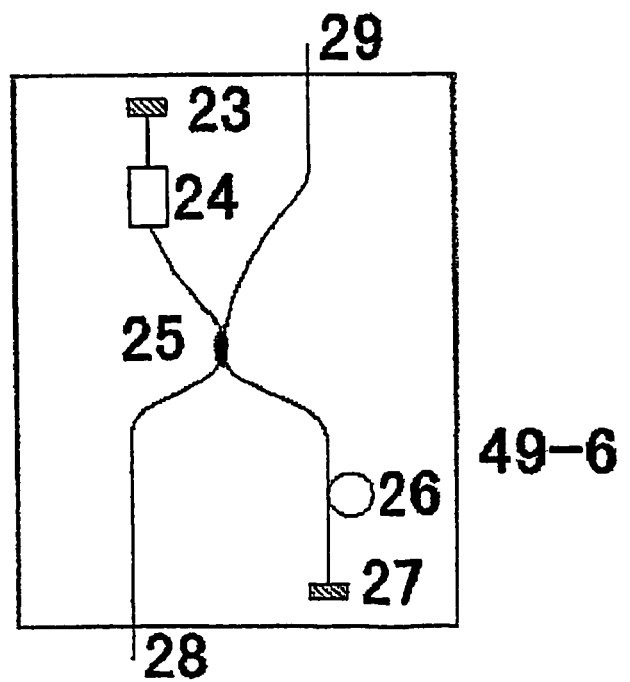
FIG. 6 is a block diagram of polarization-controlled encoder with variable beam splitter, mirrors and polarization-maintained paths.

The fourth configuration of polarization-controlled encoder in quantum key distribution system is shown in FIG. 6. It includes one 2×2 polarization-maintained variable beam splitter 25, two mirrors 23 and 27, one polarization-maintained phase modulator 24 and one polarization-maintained delay line 26. One of the two ports which are in the same side of variable beam splitter 25 is output port 28 of polarization-controlled encoder, and the other port connects with delay line 26 and mirror 27 in turn. One of the two ports which are in the other side of variable beam splitter 25 is input port 29 of polarization-controlled encoder, and the other port connects with polarization-maintained phase modulator 24 and mirror 23 in turn. A variation of above configuration is to connect one port of beam splitter with delay line 26 and modulator 24 (no sequencing) in turn, and connect the other port of beam splitter with only a mirror. When the system works, an optical pulse is injected into port 29 of polarization-maintained variable beam splitter 25 and divided into two pulses. One pulse exits directly from port 28 of polarization-maintained variable beam splitter 25. The other pulse pass through the delay line 26 and reflected back by mirror 27, and then pass through beam splitter 25 again and continue passing through modulator 24 and reflected by mirror 23, and then pass through the beam splitter 25 at third time and output from port 28. When splitting the optical pulse, the splitting ratio of variable beam splitter is regulated to make the two pulses exit from port 28 have equal amplitude. Because all the paths are polarization-maintained, the output pulses have same polarization state. The variation of above configuration has same result. Either port 28 is input and port 29 is output or reverse has same result.

Sixth Embodiment

Figure 7:
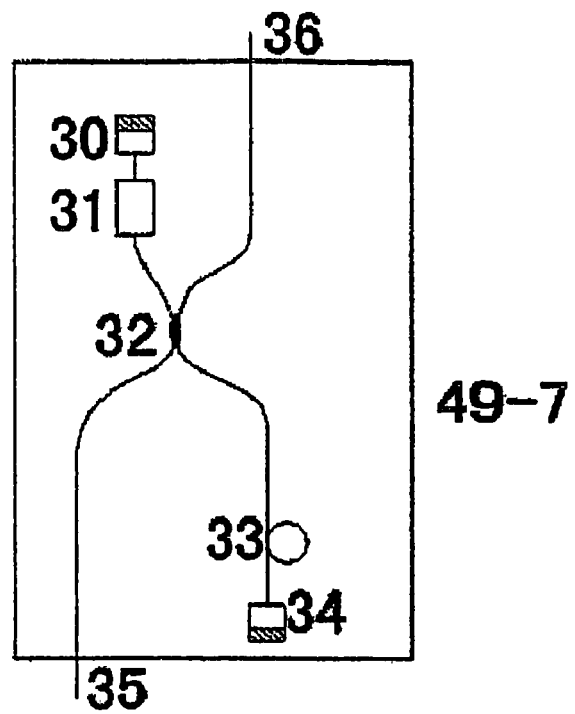
FIG. 7 is a block diagram of polarization-controlled encoder with variable beam splitter and 90 degree Faraday mirrors.

The fifth configuration of polarization-controlled encoder in quantum key distribution system is shown in FIG. 7. It includes one 2×2 variable beam splitter 32, two 90 degree Faraday mirrors 30 and 34, one phase modulator 31 and one delay line 33. One of the two ports which are in the same side of variable beam splitter 32 is output port 35 of polarization-controlled encoder, and the other port connects with delay line 33 and 90 degree Faraday mirror 34 in turn. One of the two ports which are in the other side of variable beam splitter 32 is input port 36 of polarization-controlled encoder, and the other port connects with phase modulator 31 and 90 degree Faraday mirror 30 in turn. A variation of above configuration is to connect one port of beam splitter with delay line 33 and modulator 31 (no sequencing) in turn, and connect the other port of beam splitter with only a 90 degree Faraday mirror. When the system works, an optical pulse is injected into port 36 of variable beam splitter 32 and divided into two pulses. One pulse outputs directly from port 35 of variable beam splitter 32. The other pulse pass through the delay line 33 and reflected back by 90 degree Faraday mirror 34, and then passes through beam splitter 32 again and continue passing through modulator 31 and reflected by 90 degree Faraday mirror 30, and then passes through the beam splitter 32 at third time and exits from port 35. When splitting the optical pulse, the splitting ratio of variable beam splitter is regulated to make the two pulses output from port 35 have equal amplitude. Because the two pulses are reflected by 90 degree Faraday mirrors and pass through their own path even times, the output pulses have same polarization state. The variation of above configuration has same result. Either port 35 is input and port 36 is output or reverse have same result.

Seventh Embodiment

Figure 5:
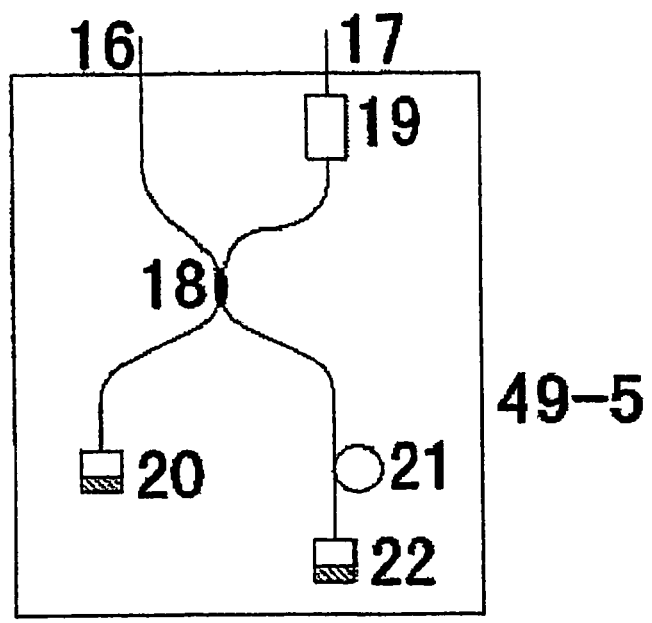
FIG. 5 is a block diagram of polarization-controlled encoder with 90 degree Faraday mirrors in which the modulator is located in the output path.

In above five configurations of polarization-controlled encoder, the phase modulator can be moved to output path to get the same result. For example, a polarization-controlled encoder with phase modulator in output path is shown in FIG. 5. It includes one 2×2-3 dB beam splitter 18, two 90 degree Faraday mirrors 20 and 22, one phase modulator 19 and one delay line 21. Port 16 of the two ports which are in the same side of 3 dB beam splitter 18 is input port of polarization-controlled encoder, and the other port connects with modulator 19 as output port 17 of encoder. One of the two ports which are in the other side of 3 dB beam splitter 18 connects with 90 degree Faraday mirror 20, and the other port connects with delay line 21 and 90 degree Faraday mirror 22 in turn. When the encoder is used in receiver, the modulator which is located in output path must be moved to input path. For example, modulator 19 in encoder 49-5 must connect with port 16 instead of port 17. When the system works, an optical pulse is injected into port 16 of beam splitter 18 and divided into two pulses. One pulse pass through the delay line 21 and reflected back by 90 degree Faraday mirror 22. The other pulse is reflected back by 90 degree Faraday mirror 20. Then they are recombined by beam splitter 18, pass through modulator 19 and exit from port 17. Because these two pulses are reflected by 90 degree Faraday mirrors and pass through their own path even times, the output pulses have same polarization state. When this encoder is used in receiver, the modulator 19 which is located in output path must be moved to input path. Either in output path of transmitter or input path of receiver, the modulator need not be polarization-maintained.

Eighth Embodiment

Figure 8:
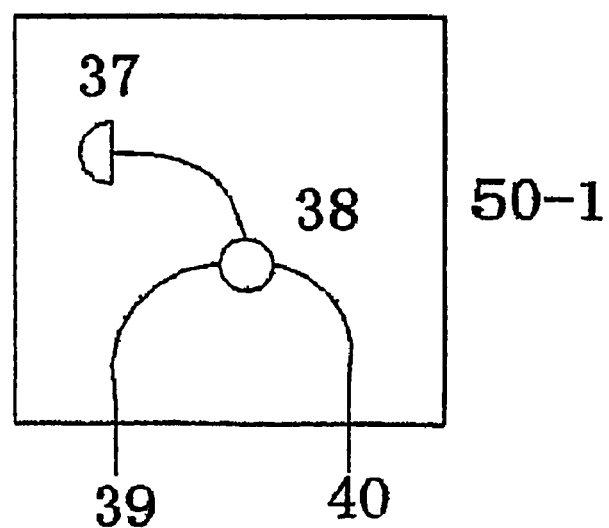
FIG. 8 shows one return photon separating and detecting unit.

The return photon separating and detecting unit in the quantum key distribution system is made up of optical circulator 38 and single photon detector 37. The input port 39 of optical circulator is the input port of return photon separating and detecting unit. The output port 40 of optical circulator is the output port of return photon separating and detecting unit. The return photon injected into port 40 will be separated by circulator 38 and detected by single photon detector 37. The configuration of the unit is shown in FIG. 8. When the system works, photons injected into port 39 of circulator pass through the circulator directly and exit from port 40. If there are photons injected into port 40, they will be prevented from exiting from port 39 but guided to single photon detector 37 by circulator 38 in order to detect whether there are spy photons or not. When this unit is used in receiver, single photon detector 37 could detect signal photon to get useful key information.

Ninth Embodiment

Figure 9:
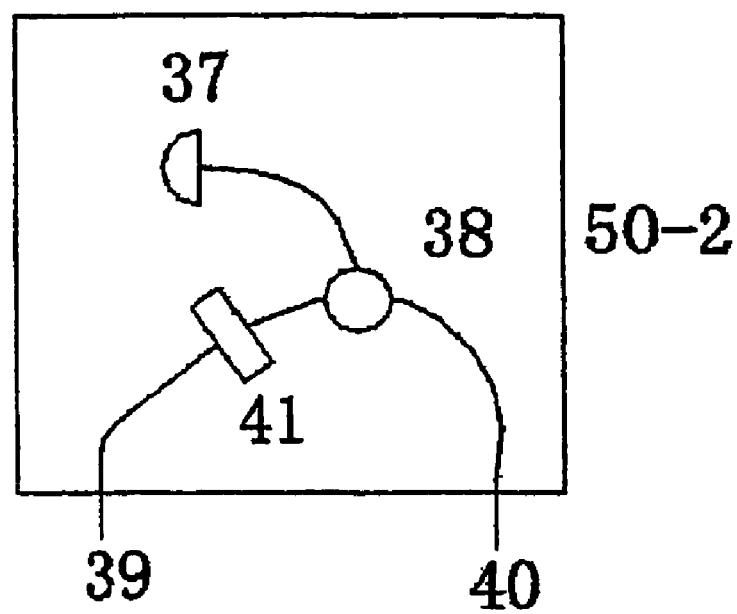
FIG. 9 shows another return photon separating and detecting unit which has band pass filter.

Since optical circulator and single photon detector have limited response spectrum, there may be photons whose wavelength is out of response spectrum enter the polarization-controlled encoder. A variation of the return photon separating and detecting unit is shown in FIG. 9. The difference from the above one is that an optical band pass filter 41 is added after input port 39. When the system works, photons in response spectrum pass through the optical band pass filter freely, but other photons are blocked. This will improve the system's ability of resisting eavesdropping.

Tenth Embodiment

Figure 10:
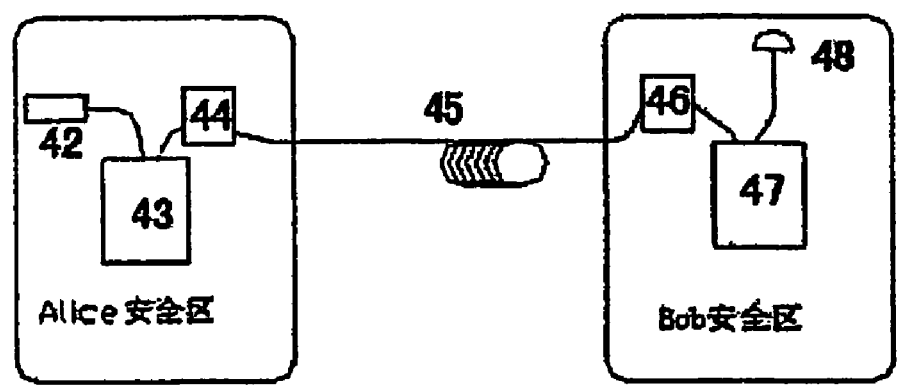
FIG. 10 is a block diagram of quantum key distribution system whose kernel part is polarization-controlled encoder and the quantum channel is optical fiber.

A quantum key distribution system including the polarization-controlled encoders, return photon separating and detecting unit, single photon detectors and optical pulse source is shown in FIG. 10. The transmitter is made up of single photon source 42 (it can be replaced by simulative single photon source which is made up of laser and attenuator), polarization-controlled encoder 43 and return photon separating and detecting unit 44. The input port of encoder 43 (it can be encoder 49-1, 49-2, 49-3, 49-6, 49-7 or any variation of them) connects with the output port of single photon source 42. The output port of encoder 43 connects with the input port of return photon separating and detecting unit 44 (it can be return photon separating and detecting unit 50-1 or 50-2). The output port of unit 44 connects with quantum channel 45.

The receiver is made up of polarization-controlled encoder 47 (it can be encoder 49-1, 49-2, 49-3, 49-6, 49-7 or any variation of them, wherein 49-3 or 49-7 is better), return photon separating and detecting unit 46 (it can be return photon separating and detecting unit 50-1 or 50-2) and single photon detector 48. Quantum channel 45 connects with the input port of unit 46. The output port of unit 46 connects with the input port of encoder 47. The output port of encoder 47 connects with single photon detector 48.

The process of quantum key distribution will be described hereinafter. One single photon pulse (it can be obtained by attenuating high power laser to at most one photon per pulse in fact) which is emitted from single photon source 42 enters polarization-controlled encoder 43, and then divided into two pulses and delayed. One of these two pulses is modulated according to quantum key distribution protocol. The output two pulses pass through return photon separating and detecting unit 44, and then enter quantum channel 45 to be transmitted to the receiver. When arrived at receiver, these two pulses pass through return photon separating and detecting unit 46 and enter polarization-controlled encoder 47. After that, each pulse is divided into two pulses again and delayed. Then these pulses are modulated according to quantum key distribution protocol and interfere. One of output interfering pulses is sent to single photon detector 48 to be measured (in order to reduce the dark count and disturbance from un-interfering pulses, the detector should work at gate mode, and the control signal of gate could be obtained from classical signal which is sent by transmitter), and the other passes through the return photon separating and detecting unit and be measured. According to the result of measurement and record of modulation, transmitter and receiver will get one bit of key. Repeat above steps, they will get any bit of keys with unconditional security. Because there are polarization-maintained paths and 90 degree Faraday mirrors in polarization-controlled encoder, two output pulses have same polarization state. That makes the system has good ability of anti-jamming. When the input and output ports are the same in transmitter and receiver, circulator and Y beam splitter should be added to separate input and output signal. When the encoders in transmitter and receiver are 49-6 or 49-7, splitting ratio of beam splitter should be regulated to make two output pulses have equal amplitude. This will reduce the error rate of final keys.

What is claimed is:

1. A polarization-controlled encoder comprising:
   a 2×2 3 dB beam splitter for splitting one injected optical pulse into two optical pulses, and for recombining the two optical pulses subjected to at least one of delay and modulation into one optical output;
   a delay line for delaying one of the two optical pulses;
   a phase modulator for phase-modulating the optical pulse according to a quantum key distribution protocol; and
   two 90 degree Faraday mirrors,
   wherein a first port on a first side of the 2×2 3 dB beam splitter is an output port of the polarization-controlled encoder, and a second port on the first side is an input port of the polarization-controlled encoder;
   a first port on a second side of the 2×2 3 dB beam splitter is connected to one of the two 90 degree Faraday mirrors, and a second port on the second side is connected to the other of the two 90 degree Faraday mirrors;
   the delay line being connected between one port of the 2×2 3 dB beam splitter and one of the two 90 degree Faraday mirrors; and
   the phase modulator being connected between a port of the 2×2 3 dB beam splitter and at least one of one of the two 90 degree Faraday mirrors and the output port of the polarization-controlled encoder.

2. The polarization-controlled encoder according to claim 1, further comprising:
   an optical circulator located at the output port of the polarization-controlled encoder, wherein light inputted into a first port of the optical circulator is outputted from a second port of the optical circulator, light inputted into the second port of the optical circulator is outputted from a third port of the optical circulator, the recombined optical output is inputted into the first port of the optical circulator and is outputted from the second port of the optical circulator.

3. The polarization-controlled encoder according to claim 2, further comprising:
   a detector connected to the third sort of the optical circulator the detector detecting return injected light from the second port of the optical circulator.

4. The polarization-controlled encoder according to claim 2, further comprising:
   an optical band-pass filter connected to the first port of the optical circulator, the original band-pass filter performing optical band-pass filtering on the recombined optical output.

5. A quantum key distribution system comprising:
   an optical pulse generator for generating optical pulses;
   a transmitter comprising a polarization-controlled encoder having a 2×2 3 dB beam splitter for splitting one injected optical pulse into two optical pulses, and for recombining the two optical pulses subjected to at least one of delay and modulation into one optical output; and two 90 degree Faraday mirrors, wherein a first port on a second side of the 2×2 3 dB beam splitter is connected to one of the two 90 degree Faraday mirrors, and a second port on the second side is connected to the other of the two 90 degree Faraday mirrors, the transmitter performing polarization-controlled encoding on the optical pulses generated by the optical pulse generator;
   a quantum channel for transmitting the recombined optical output from the transmitter;
   a receiver comprising a polarization-controlled encoder having a 2×2 3 dB beam splitter for splitting one injected optical pulse into two optical pulses, and for recombining the two optical pulses subjected to at least one of delay and modulation into one optical output; and two 90 degree Faraday mirrors, wherein a first port on a second side of the 2×2 3 dB beam splitter is connected to one of the two 90 degree Faraday mirrors, and a second port on the second side is connected to the other of the two 90 degree Faraday mirrors, the receiver decoding the recombined optical output originated from the transmitter and transmitted through the quantum channel according to the quantum key distribution protocol to generate two groups of optical pulses, each group of optical pulses being derived from one optical pulse transmitted by the transmitter; and
   a single photon detector synchronously detecting a superposition interference of optical pulses which are respectively from the two groups of optical pulses, and distributing a quantum key according to the quantum key distribution protocol.

6. The quantum key distribution system according to claim 5, wherein
   if at the transmitter side, the phase modulator is connected to the output port of the polarization-controlled encoder, then at the receiver side, the phase modulator is connected to the input port of the polarization-controlled encoder.

* * * * *